(12) United States Patent
Barsby

(10) Patent No.: US 6,880,588 B2
(45) Date of Patent: Apr. 19, 2005

(54) APPARATUS AND METHODS FOR MIXING AND INJECTING A FOAM CORE WITHIN AN EXTRUDED SHELL

(76) Inventor: James B. Barsby, 2610 Connolly La., Boise, ID (US) 83703

( * ) Notice: Subject to any disclaimer, the term of this patent is extended or adjusted under 35 U.S.C. 154(b) by 0 days.

(21) Appl. No.: 10/437,801

(22) Filed: May 13, 2003

(65) Prior Publication Data

US 2003/0193103 A1 Oct. 16, 2003

Related U.S. Application Data

(62) Division of application No. 09/860,939, filed on May 18, 2001, now Pat. No. 6,592,789.

(51) Int. Cl.[7] ................................................ B65B 1/04
(52) U.S. Cl. ....................................... 141/67; 264/45.9
(58) Field of Search .............................. 141/67, 82, 98; 425/113, 115, 122, 4 C; 264/45.9, 46.1, 46.6; 222/540

(56) References Cited

U.S. PATENT DOCUMENTS

| | | | | |
|---|---|---|---|---|
| 4,600,461 A | * | 7/1986 | Guy | ...................... 156/244.12 |
| 5,393,536 A | | 2/1995 | Brandt | |
| 5,415,822 A | | 5/1995 | Cook | |
| 5,783,125 A | * | 7/1998 | Bastone et al. | ............ 264/45.3 |
| 5,965,075 A | * | 10/1999 | Pauley et al. | ............ 264/176.1 |
| 6,083,601 A | | 7/2000 | Prince | |
| 6,592,789 B1 | * | 7/2003 | Barsby | ...................... 264/45.9 |

* cited by examiner

Primary Examiner—Steven O. Douglas
(74) Attorney, Agent, or Firm—Charles R. Clark

(57) ABSTRACT

An apparatus and methods for mixing and injecting a foam core within an extruded shell preferably of plastic downstream from an extrusion die to produce a uniform building product. The preferred apparatus includes a mixing head injector for mixing a binary system foam. The mixing head injector incorporates pressurized gas injection for homogenization of the foam core. A preferred method employs the mixing head injector and a novel calibrator thereby allowing injection of a foam core within the shell as it passes through a calibrator to reliably produce a uniform building product. An alternative method employs a second extruder. Alternative methods employ a mounting fixture downstream of a first calibrator.

2 Claims, 3 Drawing Sheets

APPARATUS AND METHODS FOR MIXING AND INJECTING A FOAM CORE WITHIN AN EXTRUDED SHELL

CROSS-REFERENCE TO RELATED APPLICATIONS

This is a division of application Ser. No. 09/860,939, filed May 18, 2001, now U.S. Pat. No. 6,592,789 granted Jul. 17, 2003.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates to a novel apparatus and methods for the forming of a building material that may replace more expensive materials or materials that are more limited in supply. The preferred method begins with an extruder with an extrusion die that produces an extruded shell preferably of plastic that may have various profiles but each shell has an open gap preferably formed in its top working surface between spaced and parallel edges of the shell. The shell is then conducted into and through a calibrator where a vacuum is applied to the exterior of the shell to maintain the shape of the shell as it passes through the calibrator. The calibrator has an injection bore that in the preferred embodiment allows the inserting of an injector nozzle of a mixing head injector into and through the injection bore, through a gap in the extruded shell, and into a central shell cavity of the extruded shell as the shell passes through the calibrator. In the preferred embodiment, the mixing head injector mixes and injects a foam core through its injector nozzle and through the injection bore to fill the central shell cavity and the gap downstream from the injector nozzle as the shell passes by the injection bore. The core expands and cures as the shell and core continue through the remainder of the calibrator.

2. Description of Related Art

A number of extrusion devices exist that can aid a person in understanding the art of extrusion and foam filled extrusions. In U.S. Pat. No. 5,783,125 issued to Bastone is disclosed reinforced extrusion products and method of making same. In U.S. Pat. No. 5,393,536 issued to Brandt, a coextrusion apparatus is addressed. These prior devices use a different apparatus for the mixing and injection of a central core and introduce the central core through the extrusion die rather than downstream as done in the present invention.

In U.S. Pat. No. 6,083,601 issued to Prince, a foam wood extrusion product is disclosed that is formed by the extrusion first of a foam core that then receives a coextruded plastic cladding.

BRIEF SUMMARY OF THE INVENTION

A principal objective of this invention is to provide a novel and improved mixing head injector and a method for mixing and injecting a foam core within an extruded shell preferably of plastic having a central shell cavity and having an open gap. The foam core injection takes place downstream from an extrusion die and preferably while the shell passes through a calibrator resulting in a foam filled shell as the shell exits the calibrator. The preferred mixing head injector of the invention is novel, compact, simple, low-maintenance, and reliable for mixing a binary system foam core such as polyurethane or other suitable synthetic binary foam known in the art. Gas injection is incorporated in the mixing head injector for homogenization of the foam core. Preferably the mixing head injector is mounted in an injection bore of a calibrator. The foam core is injected from the mixing head injector into a central shell cavity through a gap in the shell and thereafter the core cures as the shell and core continue through the remainder of the calibrator.

A suitable plastic for the extruded shell is ASA commercially available in pellet form from Hughes Processing Incorporated of Costa Mesa, Calif.

In an alternative embodiment, the mixing head injector is replaced by a second extruder. The second extruder having an extruder port extrudes a foam core comprising a selected mixture of synthetic, plastic foam known in the art containing at least one filler selected from a group of fillers including glass spheres, wood flour, fly ash, chopped strand materials, or similar inert materials through the extruder port. Suitable blowing agents for the selected plastic foam as known in the art would be used with the second extruder. The foam core would be extruded into the central shell cavity of the extruded shell as it passes by the extruder port. The extruder port of the second extruder would be mounted into and through the injection bore of the calibrator.

In alternative methods, the injection of a foam core by the mixing head injector or the second extruder within the central shell cavity of an extruded shell can occur after the shell exits the calibrator. In such alternative methods, the shell is conveyed into and through a suitable mounting fixture and the mixing head injector or the second extruder is mounted in the mounting fixture. Preferably the mounting fixture has a mounting fixture bore in which the injector nozzle of the mixing head injector or extruder port of the second extruder can be mounted and the foam core is injected through the mounting fixture bore and into the central shell cavity through the gap in the shell as the shell passes through the mounting fixture and thereafter the core cures as the shell and core continue through the remainder of the mounting fixture. The mounting fixture can be a second calibrator.

A further object of the invention is to provide a timesaving and economical method and apparatus for the production of a foam filled extruded building material.

Additional and various other objects and advantages attained by the invention will become more apparent as the specification is read and the accompanying figures are reviewed.

DETAILED DESCRIPTION OF THE INVENTION

Figure 1A:
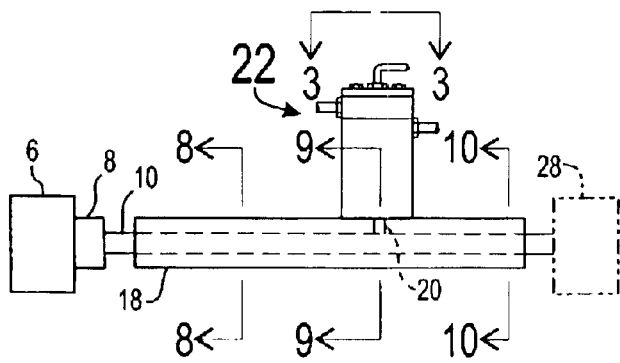
FIG. 1A is a side schematic view showing an extrusion and calibrator line with a mixing head injector.
Figure 1B:
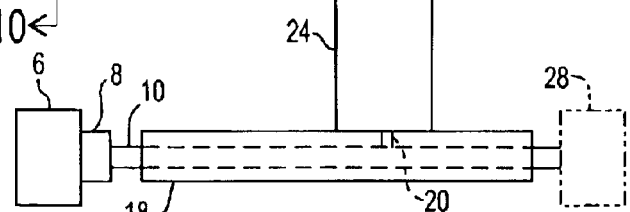
FIG. 1B is a side schematic view showing an alternative extrusion and calibrator line with a second extruder.

Referring to FIG. 1A, the present invention is novel and provides an extrusion and calibrator line comprising an extruder 6 that extrudes through an extrusion die 8 an extruded shell 10 having an open gap formed preferably in the shell's top working surface. The gap in the shell 10 exists between spaced and parallel first and second shell edges 12 and 14. A central shell cavity 16 is located through the gap between the edges 12 and 14 and to the inside of the shell 10. From the die 8, the shell 10 passes into and through a calibrator 18 that cools and conditions the shell as it passes through the calibrator. The calibrator 18 has an injection bore 20 as shown in FIGS. 1A, 1B, 4, and 9 to which is mounted a mixing head injector 22 or alternatively a second extruder 24 as shown in FIG. 1B.

Figure 2A:
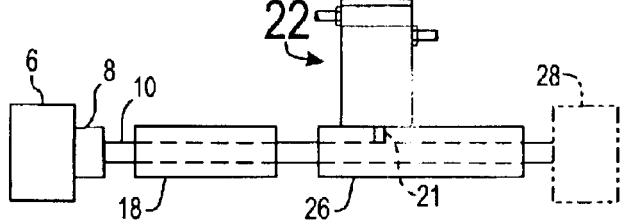
FIG. 2A is a side schematic view showing an alternative extrusion and calibrator line with a mounting fixture and a mixing head injector.
Figure 2B:
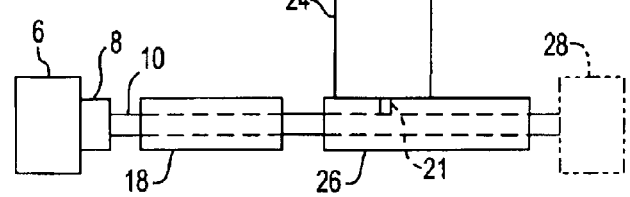
FIG. 2B is a side schematic view showing an alternative extrusion and calibrator line with a mounting fixture and a second extruder.
Figure 3:
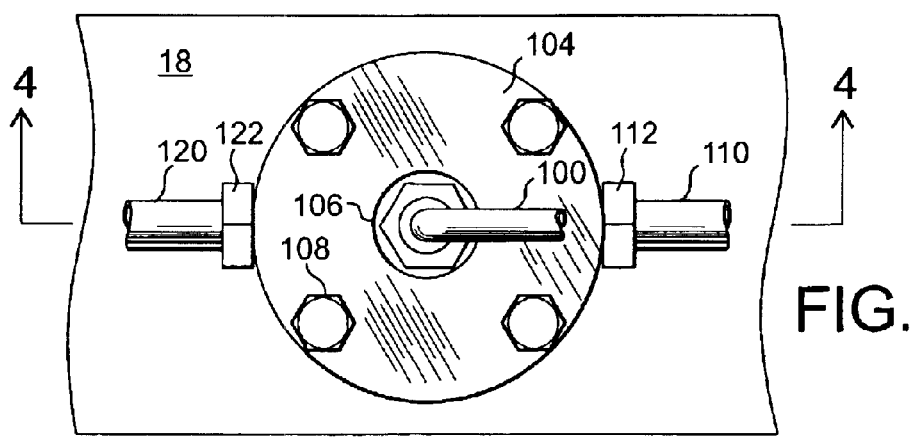
FIG. 3 is a view of the mixing head injector and calibrator as viewed from direction 3—3 in FIG. 1A.

Alternatively as shown in FIGS. 2A and 2B, the extruded shell 10 exits the calibrator 18 and is conveyed into and through a suitable mounting fixture 26. The mixing head injector 22 or the second extruder 24 can be mounted in a mounting fixture bore 21 of the mounting fixture 26, said mounting fixture being downstream of the calibrator 18 and there inject a foam core after the shell 10 exits a first calibrator. The suitable mounting fixture 26 can be a second calibrator.

Tractor means 28 well known in the art such as pull rollers pull the shell 10 through the extrusion and calibration line.

The extrusion die 8 may be of various configurations to produce shells 10 with the desired cross-sectional profile. The shell cross-sectional profile may be rectangular, triangular, circular, polygonal, or other desired geometric shape.

Preferably the calibrator 18 has a low-friction coating 30 (which may be a Teflon™ coating) on at least its interior surface which is adjacent to the first and second shell edges 12 and 14 and through which the injection bore 20 passes. A mixing head injector 22 is snugly fitted and mounted in the injection bore 20. Alternatively, a second extruder 24 may be mounted in the injection bore 20.

Figure 4:
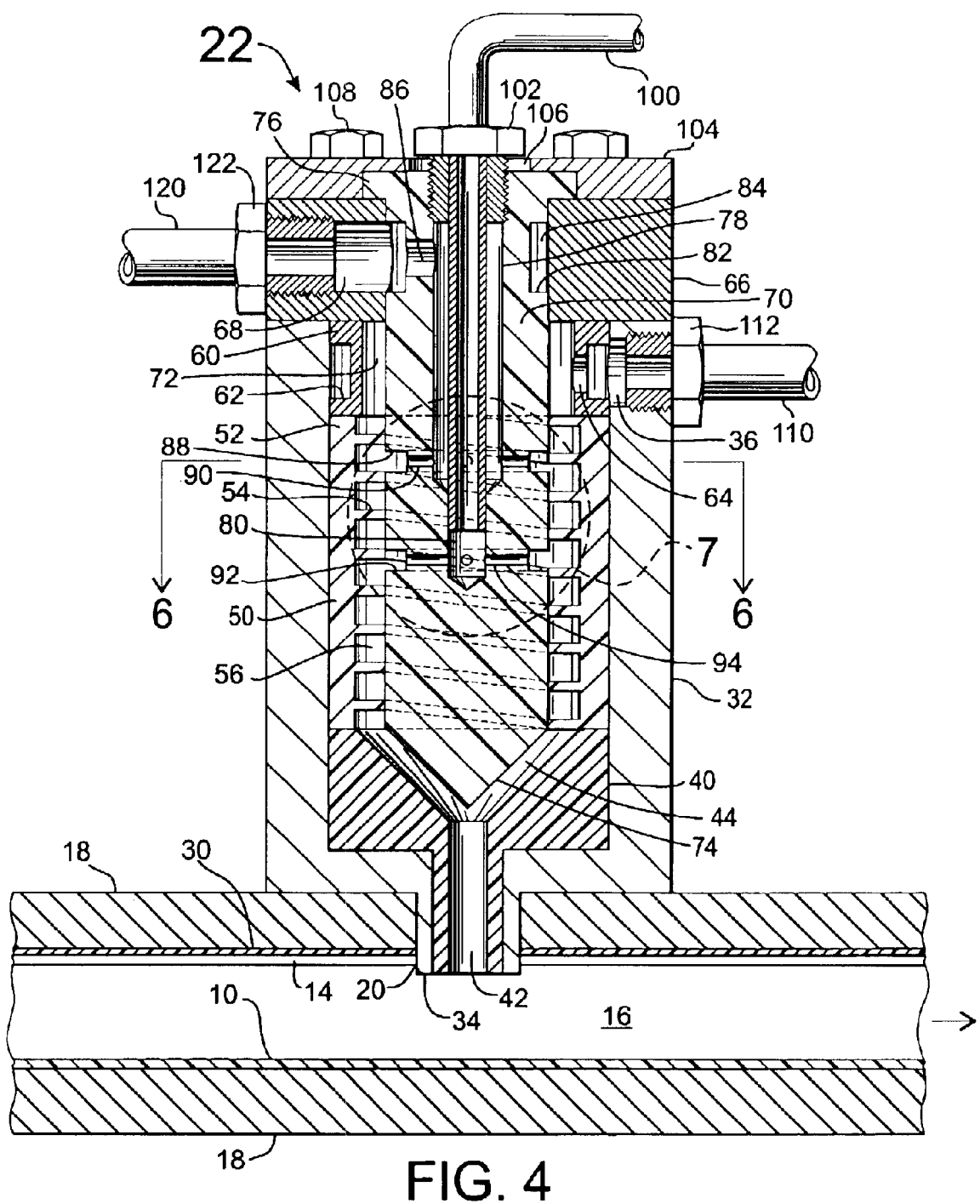
FIG. 4 is a sectional view of the mixing head injector and calibrator along the line 4—4 in FIG. 3 without the foam components and the foam core shown.
Figure 6:
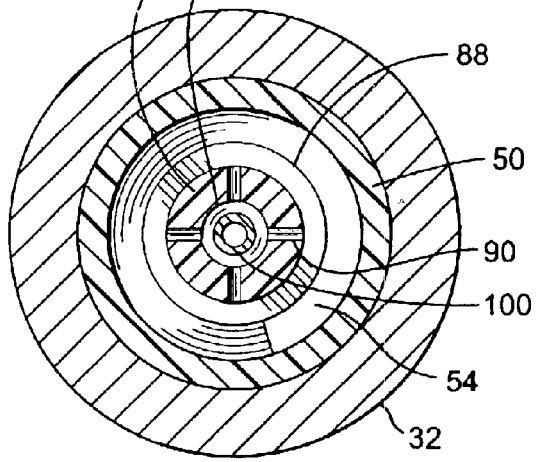
FIG. 6 is a sectional view of the mixing head injector along the line 6—6 in FIG. 4.
Figure 8:
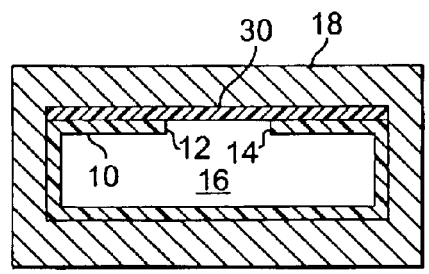
FIG. 8 is a cross sectional view of the calibrator and extruded shell along the line 8—8 in FIG. 1A.
Figure 9:
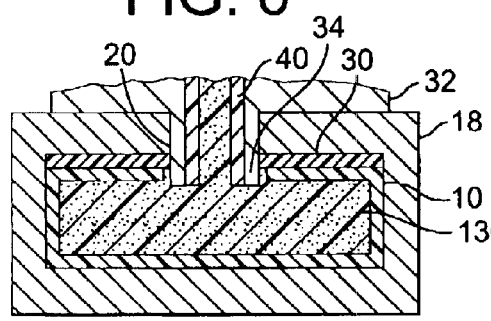
FIG. 9 is a partial cross sectional view along the line 9—9 in FIG. 1A.
Figure 10:
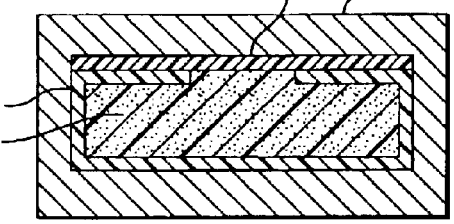
FIG. 10 is a cross sectional view along the line 10—10 in FIG. 1A.

In the preferred embodiment, the mixing head injector 22 has a cylindrical hollow case 32 as shown in FIGS. 4, 6, and 9. The case 32 has a closed end and an open end. At its closed end, the case 32 has an injector nozzle 34. When mounted in the injection bore 20, the injector nozzle 34 preferably protrudes through the injection bore 20 of the calibrator 18, through the gap of a passing shell 10, and opens into the central shell cavity 16. The case 32 has a case wall bore 36 that passes preferably radially through the case near its open end away from the injector nozzle 34.

An injector disc 40 is first mounted and nested in the case 32 as best shown in FIG. 4. Preferably, the injector disc 40 has a funnel shaped bore 42 through it that communicates freely out from the interior of the case 32, that passes through the injector nozzle 34, and that funnels into the central shell cavity 16 of a passing shell 10. A spiral sleeve 50 is next mounted and nested in the case 32 adjacent to the injector disc 40.

The spiral sleeve 50 has a first end 52 that is away from the injector disc 40. The spiral sleeve 50 has an interior threaded spiral ramp 54 along the sleeve's interior axial bore. The spiral ramp 54 defines an open spiral channel 56 along the sleeve's interior axial bore. The spiral channel 56 spirals from the first end 52 to meet and communicate with the funnel shaped bore 42 of the injector disc 40. The spiral channel 56 is open to and exists along the interior axial bore of the spiral sleeve 50. The interior axial bore of the spiral sleeve 50 and the funnel shaped bore 42 are preferably coaxial and the spiral channel 56 meets and communicates freely with the funneled shaped bore.

An annular spacer 60 with an interior axial bore is next mounted and nested in the case 32 adjacent and coaxially to the spiral sleeve 50. The annular spacer 60 has an annular spacer groove 62 circumscribing its outer surface. One or more annular spacer groove bores 64 pass preferably radially from the annular spacer groove 62 and through the annular spacer 60. Each annular spacer groove bore 64 allows free communication between the interior axial bore of the annular spacer 60 and the annular spacer groove 62. The diameter of the interior axial bore of the annular spacer 60 is preferably larger than the diameter of the interior axial bore of the spiral sleeve 50.

A case ring 66 with an interior axial bore preferably of the same diameter as the axial bore of the spiral sleeve 50 is next mounted adjacent and coaxially to the case 32 and the annular spacer 60. A case ring bore 68 passes preferably radially through the case ring 66 and into its interior axial bore as best shown in FIG. 4.

As best shown in FIG. 4, a central stem 70 is inserted into and throughout the axial bores of the case ring 66, the annular spacer 60, and the spiral sleeve 50. Preferably the central stem 70 is inserted partially into the funnel shaped bore 42. Preferably, the central stem 70 is close fitting in the axial bores of the case ring 66 and the spiral sleeve 50.

Between the annular spacer 60 and the central stem 70 is a first annular space 72 in free communication with the spiral channel 56, said spiral channel defined by the spiral sleeve 50, the spiral ramp 54, and the central stem 70. Preferably, the central stem 70 has a tapered end 74 that partially extends into the funnel shaped bore 42 of the injector disc 40. The tapered end 74 and the injector disc 40 define a funnel channel 44 which is in free communication with the spiral channel 56 and with the central shell cavity 16 of a shell 10 passing by the injection bore 20.

Figure 5:
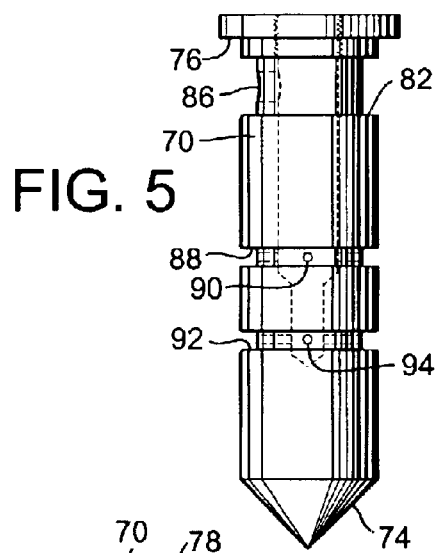
FIG. 5 is a side elevational view of the central stem of the mixing head injector.

Preferably, as shown in FIGS. 4 and 5, the central stem 70 has a shoulder 76 at its end away from the tapered end 74. Preferably the shoulder 76 has a radius from the longitudinal axis of the stem 70 that is larger than the radius of the interior axial bore of the case ring 66. The shoulder 76 helps seal the central stem 70 to the case ring 66.

Figure 7:
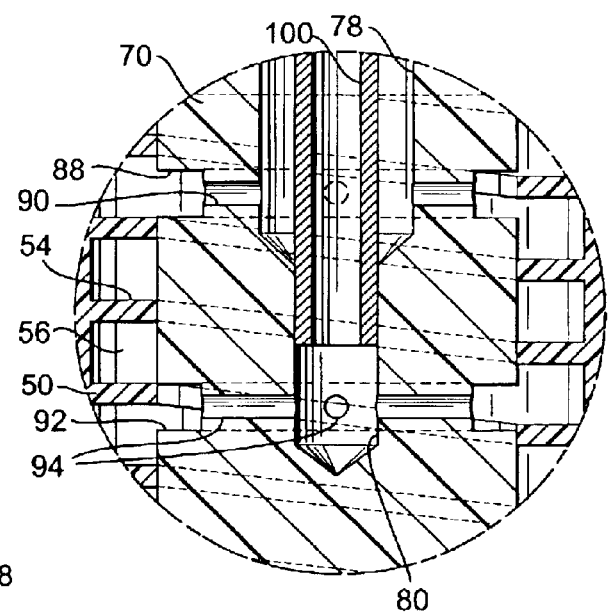
FIG. 7 is a detail view from FIG. 4.

The central stem 70 has an outer axial stem bore 78 and an inner axial stem bore 80 as shown in FIGS. 4, 5, and 7. The depth of the inner axial stem bore 80 into the stem 70 is greater than the depth of the outer axial stem bore 78.

When the mixing head injector 22 is assembled, the outer axial stem bore 78 coaxially extends fully through the axial bores of the case ring 66 and of the annular spacer 60 and coaxially extends partially into and along the axial bore of the spiral sleeve 50. The central stem 70 has an inner axial stem bore 80 of smaller diameter than the outer axial stem bore 78 that coaxially extends further than the outer axial stem bore into and along the axial bore of the spiral sleeve 50 as best shown in FIGS. 4 and 6.

The central stem 70 has a first annular stem groove 82 circumscribing the stem. Between the first annular stem groove 82 and the case ring 66 is a second annular space 84. The case ring bore 68 allows free communication into the second annular space 84. A first annular stem groove bore 86 passes preferably radially from the first annular stem groove 82 and into the outer axial stem bore 78 and allows free communication between the first annular stem groove and the outer axial stem bore. The first annular stem groove 82 is preferably near the shoulder 76.

The central stem 70 has a second annular stem groove 88 circumscribing the stem immediately adjacent the spiral ramp 54 and located below the first end 52 of the spiral sleeve 50. A plurality of second annular stem groove bores 90 pass preferably radially from the second annular stem groove 88 and into the outer axial stem bore 78 and allow free communication from the outer axial stem bore into the second annular stem groove. The second annular stem groove 88 is in immediate communication with the spiral channel 56.

The central stem 70 has a third annular stem groove 92 circumscribing the stem immediately adjacent the spiral ramp 54 and located below and downstream of the second annular stem groove 88. A plurality of third annular stem groove bores 94 pass preferably radially from the third annular stem groove 92 and into the inner axial stem bore 80 and allow free communication from the inner axial stem bore into the third annular stem groove. The third annular stem groove 92 is in immediate communication with the spiral channel 56.

A central gas pipe 100 extends coaxially through a pipe fitting 102 and throughout the length of the outer axial stem bore 78. The pipe fitting 102 sealingly fits the central gas pipe 100 into the outer axial stem bore 78 in a manner well understood in the art as best shown in FIG. 4. The central gas pipe 100 preferably has the same diameter as the inner axial stem bore 80 and is press fit into the upper portion of the inner axial stem bore 80 thereby isolating the lower portion of the inner axial stem bore from the outer axial stem bore 78. As shown in FIGS. 4 and 7, the central gas pipe 100 stops short and clear of a plurality of third annular stem groove bores 94 located in the lower portion of the inner axial stem bore 80. The central gas pipe 100 communicates through the inner axial stem bore 80, the third annular stem groove bores 94, and into the third annular stem groove 92.

A case cap 104 is fitted atop the case ring 66. The case cap 104 secures the central stem 70 in the axial bore of the case ring 66. The case cap 104 has a case cap bore 106 that is coaxial to the outer axial stem bore 78. The central gas pipe 100 and the pipe fitting 102 pass through the case cap bore 106. Preferably, the case cap 104, the case ring 66, and the case 32 are secured together by a plurality of case bolts 108 in a manner well understood in the art.

A first component conduit 110 communicates through a first component conduit fitting 112 into the case wall bore 36. The first component conduit fitting 112 sealingly fits the first component conduit 110 into the case wall bore 36 in a manner well understood in the art as best shown in FIG. 4.

A second component conduit 120 communicates through a second component conduit fitting 122 into the case ring bore 68. The second component conduit fitting 122 sealingly fits the second component conduit 120 into the case ring bore 68 in a manner well understood in the art as best shown in FIG. 4.

Preferably the injector disc 40, the spiral sleeve 50, the spiral ramp 54, and the central stem 70 are all fabricated from solid Teflon™ or other non-stick plastic material. As well known in the art, O-rings can be used in the mixing head injector 22 to keep undesired leakage through close fitting parts under control.

In the preferred embodiment, primary mixing of a foam core 130 occurs in a spiral channel 56 defined by a spiral ramp 54 along the interior bore of a spiral sleeve 50 that coaxially surrounds a central stem 70. First delivery means such as a reservoir of component one of a foam connected to a pump and connected to a first component conduit 110 for controlled delivery of component one supplies the mixing head injector 22 with component one. Second pumping means such as a reservoir of component two of a foam connected to a pump and connected to a second component conduit 120 for controlled delivery of component two supplies the mixing head injector 22 with component two. Third pumping means such as a reservoir of gas connected to a pump and connected to a central gas pipe 100 for controlled delivery of pressurized gas supplies the mixing head injector with homogenizing gas, preferably air.

Component one is pumped through a first component conduit 110 into a case wall bore 36, then into an annular spacer groove 62 and then through one or more annular spacer groove bores 64 and into a first annular space 72 that is in direct communication with a spiral channel 56 at a first end 52 of a spiral sleeve 50.

Component two is pumped through a second component conduit 120 into a case ring bore 68 and then into a first annular stem groove 82, then through one or more first annular stem groove bores 86, then into an outer axial stem bore 78 and then through a plurality of second annular stem groove bores 90 and into a second annular stem groove 88 and then into direct communication with component one in a spiral channel 56.

The second annular stem groove 88 is in immediate communication with the spiral channel 56 throughout nearly the entire circumference of the second annular stem groove and thus greatly improves the mixing of component two with component one. The foam core 130 then is injected with an homogenizing gas through a central gas pipe 100 mounted in an inner axial stem bore 80 of the central stem 70. The gas exits the inner axial stem bore 80 through a plurality of third annular stem groove bores 94 in the central stem 70 and into a third annular stem groove 92 and then into the mixing components one and two in the spiral channel 56.

The spiral channel 56 conveys the mixing components into a funnel channel 44 that is preferably defined by a tapered end 74 of the central stem 70 and a funnel shaped bore 42 in an injection disc 40. The funnel channel 44 then conveys the foam core 130 through the injection disc 40 and allows the passage of the foam core out of the mixing head injector 22 through an injector nozzle 34 and into a central shell cavity 16 of a passing shell 10. The foam core 130 substantially fills the central shell cavity 16 and the gap between edges 12 and 14 of the shell 10 after the shell passes the injector nozzle 34. Preferably, the foam core 130 cures as the foam core progresses with the shell 10 through the remainder of the calibrator 18.

A further object of this invention is providing an apparatus and method of injecting a foam core 130 into a shell 10 while the shell passes through a calibrator 18 downstream of the extrusion die 8 in an extrusion and calibrator line resulting in a uniform foam core building material. In the preferred embodiment, the foam core 130 is injected through an injector nozzle 34 of a mixing head injector 22 and through an injection bore 20 in a calibrator 18 and through a gap in a shell 10 as it passes through the calibrator 18.

The present invention provides in the preferred embodiment, a new mixing head injector 22 mounted in an injection bore 20 of a calibrator 18 to inject a foam core 130 in an extruded shell 10 to produce a uniform building product in a continuous process. Alternatively, a second extruder 24 can be used to inject a foam core 130 or some other foamed core. Alternatively, as best shown in FIG. 2A and FIG. 2B, the mixing head injector 22 or a second extruder 24 can be mounted in a mounting fixture 26 downstream of a first calibrator 18.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. A method for mixing and injecting a foam core within an extruded shell, said method comprising the steps of:
   a. extruding a shell having a gap and a central shell cavity from an extrusion die;
   b. conveying said shell downstream from said extrusion die into and through a calibrator, said calibrator having an injection bore;
   c. mounting in said injection bore, a second extruder, said second extruder having an extruder port;
   d. extruding a foam core through said extruder port and into said central shell cavity thereby producing a filled shell; and
   e. maintaining said filled shell under conditions whereby said shell becomes cooled and said foam core becomes cured so as to form said filled shell.

2. A method for mixing and injecting a foam core within an extruded shell, said method comprising the steps of:
   a. extruding a shell having a gap and a central shell cavity from an extrusion die;
   b. conveying said shell downstream from said extrusion die into and through a calibrator;
   c. conveying said shell into and through a mounting fixture, said mounting fixture having a mounting fixture bore;
   d. mounting in said mounting fixture bore, an extruder port of a second extruder;
   e. extruding a foam core through said extruder port and into said central shell cavity thereby producing a filled shell; and
   f. maintaining said filled shell under conditions whereby said shell becomes cooled and said foam core becomes cured so as to form said filled shell.

* * * * *